J. Macadam.
Curd Cutter.
N° 79,365. Fig. 2  Patented Jun. 30, 1868.

Witnesses.
W. C. Dennis.
H. A. Cornell.

Inventor
James Macadam
By his Atty J. Dennis Jr.

United States Patent Office.

JAMES MACADAM, OF LITTLE FALLS, NEW YORK.

Letters Patent No. 79,365, dated June 30, 1868; antedated February 28, 1868.

IMPROVEMENT IN CURD-MILL.

The Schedule referred to in these Letters Patent and making part of the same.

TO ALL WHOM IT MAY CONCERN:

Be it known that I, JAMES MACADAM, of Little Falls, Herkimer county, State of New York, have invented an Improved Curd-Mill or Curd-Breaker; and I do hereby declare the following description and accompanying drawings are sufficient to enable any person skilled in the art or science to which it most nearly appertains to make and use my said invention or improvements without further invention or experiment.

The nature of my invention and improvement consists in providing a frame, designed to be placed upon a cheese-tub or vat, and to support a box or hopper, having in its lower part a cylinder, with long teeth or pins, arranged spirally upon and projecting from its surface, said teeth passing, as the cylinder revolves, between horizontal bars or plates, placed beneath the cylinder, in a direction at right angles to its axis, said cylinder being provided with a pinion, gear, and crank, and a fly-wheel for revolving it.

In describing my curd-mill, I refer to the accompanying drawings, forming part of this specification—

Figure 1:
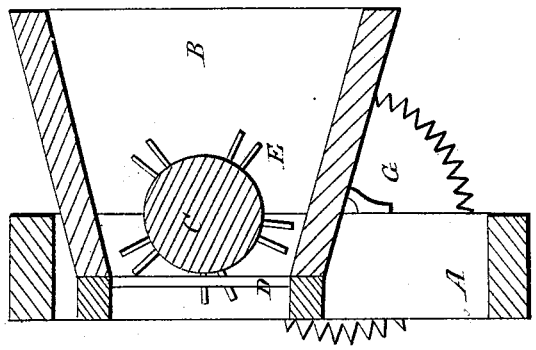
Figure 1:
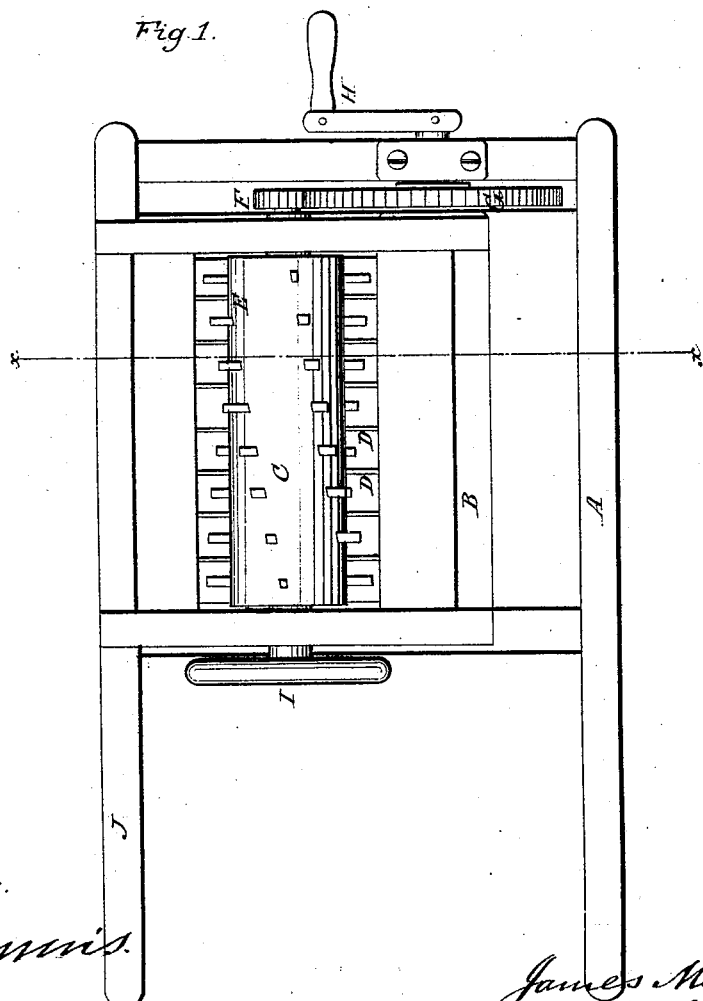

Figure 1 being a plan or top view of my mill, and

Figure 2 a vertical section of the same, through the line $x\,x$ on fig. 1.

A is a frame, intended to be placed upon the tub or vat that is to receive the broken curd, and to support the box or hopper B, into which the curd to be broken is put. C is a cylinder, the projections of its axis resting upon and turning in boxes on the frame A, and provided with long teeth or pins, E E, arranged spirally upon and projecting from its circumference, and so as to pass, as the cylinder revolves, between the horizontal plates or bars D D, extending across the bottom of the hopper, just beneath the cylinder, and in a direction at right angles to its axis, and being set vertically edgewise so as more readily to divide and comminute the curd as it passes down. The pinion F, on the axis of the cylinder C, is turned by the gear-wheel G, operated by the crank H, the fly-wheel I tending to maintain and equalize the motion. The arms J J, extending out from the frame A, are convenient for removing the mill or carrying it from place to place, and for supporting it upon a vat or tub.

Portions of curd being placed in the hopper and the crank turned, the teeth on the revolving cylinder tear off pieces of the same, carrying them down through the grate beneath, the bars of which aid in breaking up the curd and comminuting it to the degree required.

What I claim as my invention, and desire to secure by Letters Patent, is—

The combination and arrangement of the hopper, provided with a grate of straight bars beneath, and the toothed cylinder turning in said hopper, and having its teeth to pass down between said bars, substantially as described, and for the purposes set forth.

JAMES MACADAM.

Witnesses:
  JAS. D. NUTER,
  CHAS. H. STROUGH.